United States Patent [19]

Cowen

[11] 4,220,411
[45] Sep. 2, 1980

[54] FIBER OPTIC LIGHT LAUNCHING ASSEMBLY

[75] Inventor: Steven J. Cowen, San Diego, Calif.

[73] Assignee: The United States of America as represented by the Secretary of the Navy, Washington, D.C.

[21] Appl. No.: 933,304

[22] Filed: Aug. 14, 1978

[51] Int. Cl.³ .............................................. G01N 21/00
[52] U.S. Cl. .................................. 356/73.1; 350/96.18; 356/432
[58] Field of Search .............................. 356/73.1, 432; 350/96.18

[56] References Cited

U.S. PATENT DOCUMENTS 3,914,013  10/1975  Rosenberg ........................ 350/96.18

FOREIGN PATENT DOCUMENTS 1486633  9/1977  United Kingdom ...................... 356/73.1

OTHER PUBLICATIONS

"An Apparatus for the Measurement of the Mode Cut-off Wavelengths of Optical Fibre Waveguides" Worthington; J. Phys. E.; vol. 4 #12; Dec. 1971; pp. 1052-1054.

*Primary Examiner*—Vincent P. McGraw
*Attorney, Agent, or Firm*—Richard S. Sciascia; Ervin F. Johnston; Thomas Glenn Keough

[57] ABSTRACT

An apparatus allows the testing of differently diametered optical fibers having different numerical apertures to determine their optical properties. A system of lenses and optically cooperating components permits the precise regulation of a light spot size and the adjustment of a particular numerical aperture so that equilibrium conditions at the launch end of a test fiber is created. Adjustments allow an observed variance of the spot size and numerical aperture so that the apparatus can accommodate differently sized test optic fibers.

10 Claims, 1 Drawing Figure

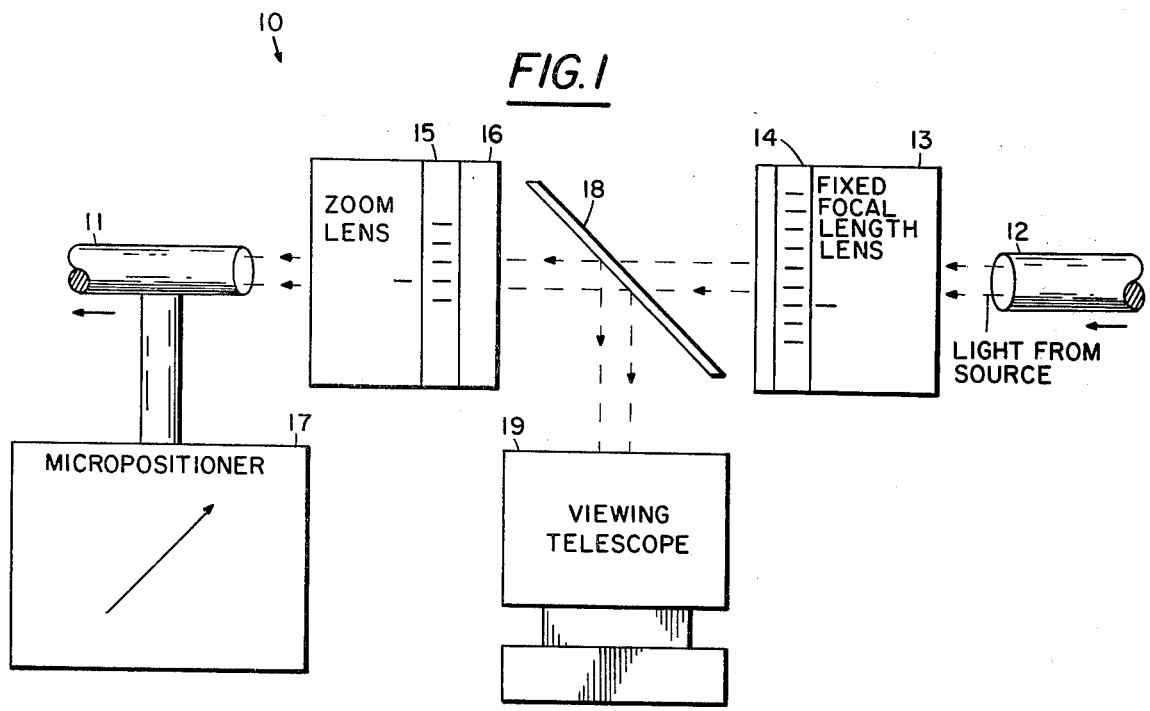

FIBER OPTIC LIGHT LAUNCHING ASSEMBLY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

With the increasing emphasis on designing suitable fiber optics, a wide variety of types have evolved which exhibit numerous dissimilar operational parameters. Standardization and categorization of the fibers calls for testing them and evaluating them for a variety of applications. When input excitation is applied to a test fiber, the spot size and numerical aperture (cone convergence solid angle), of the light input is generally fixed by the input optics. Since the multitude of fibers undergoing testing are different in their optical and physical properties to some extent, little uniform control usually is exercised over the light excitation parameters. The input equilibrium conditions generally are not approached and, consequently, measurement errors result. The errors are found to be magnified when short fiber sample lengths are employed. Thus there is a continuing need in the state of the art for an apparatus which permits the accurate control of input excitation conditions for a test optical fiber to permit near-equilibrium launch condition for accurate measurement of fiber parameters

SUMMARY OF THE INVENTION

The present invention is directed to providing an apparatus for determining the parameters of a test optic fiber. A source of light which has been suitably apertured illuminates a lens arrangement which collimates it and limits it to a beam of given diameter. The light spot is imaged onto the test optic fiber and the numerical aperture is adjusted to near-equilibrium launch conditions for accurate measurement of the fibers' parameters.

The prime object of the invention is to provide an apparatus for determining the parameters of fiber optics.

Yet another object is to provide an apparatus for adjusting the light spot and numerical aperture of a variety of test optic fibers.

Still another object is to provide an apparatus which permits an operator to observe the positioning of a light spot and to make proper adjustments on a test optic fiber.

Still another object is to provide the test apparatus which permits the precise adjustment of a test optic fiber with respect to a light spot.

Yet another object is to provide an adjustable, observable apparatus capable of accommodating differently diametered test optic fibers to nearly approximate equilibrium launched conditions.

These and other objects of the invention will become more readily apparent from the drawings when taken with the ensuing description.

BRIEF DESCRIPTION OF THE DRAWING

The drawing depicts in schematic form the optive interrelationship of the elements of the invention.

DESCRIPTION OF THE PREFERRED EMBODIMENT

Referring now to the drawing, a test apparatus 10 for a test optic fiber 11 assures that differently sized optic fibers can be tested for operational parameters quickly and accurately. The apparatus varies the spot size of a light beam emanating from a light source 12 onto an optic fiber undergoing a test as well as changing the excitation numerical aperture over a wide range in a continuous manner. The elements of the invention allow a technician to view the input end of the test optic fiber and examine the condition of the test fiber's surface and to adjust the spot such that it is properly centered on the optic fiber's core.

A typical apertured source of light can be that light emanating from a plastic clad silica fiber for example, a model PS-05-35 marketed by the ITT Company which is flooded with a filtered light from an incadescent source. Needless to say the light source could be a light emitting diode or any other extended light source capable of providing illumination at pre-established levels.

A fixed focal length lens 13 receives the light from the source. The lens chosen for purposes of demonstrating this inventive concept is a Soligor 135 mm f/2 camera lens although a number of other suitable lenses could be substituted. The lens functions to collimate the light emanating from the source and, as such, must be located approximately one lens focal length from the source. An f stop adjustment 14 allows variance of a collimated beam of light which passes to a zoom lens 15. A focussing adjustment 16 on the zoom lens focuses the light spot created by the fixed focal length lens and its f stop adjustment onto the exposed end surface of test optic fiver 11. Precise positioning of the test optic fiber on the fiber's end is readily accomplished by a three axis micropositioner 17. Thus, the focused light spot is centered on the optical core of the test optic fiber.

A beamsplitter 18, for example, a model 23-8916 marketed by Ealing is interposed in the light path between the fixed focal length lens and the zoom lens. The beamsplitter allows an observer to view the end of test optic fiber 11 through a viewing telescope 19. The scope also is manufactured by Ealing and is a 23-0466 model. Because the light rays' impinging upon the beamsplitter are collimated, the telescope is focused to infinity.

In operation, a test optic fiber of a given diameter is secured onto an extension of three axis micropositioner 17. The spot size of the collimated light is properly dimensioned by the adjustment 14 on fixed focal length lens 13 so that it properly fills the fiber core of test optic fiber 11. The micropositioner and zoom lens are adjusted so that the test optic fiber numerical aperture is matched and equilibrium conditions at the launch end of the test optic fiber are established.

The dimensions of the spot size can be expressed as a function of the focal length of the lens and the diameter is given by:

$$S_2 = S_1 (F_2/F_1)$$

Where:
$S_2$ = spot diameter at test optic fiber 11
$S_1$ = diameter of source 12
$F_2$ = focal length of lens 15
$F_1$ = focal length of lens 13

In like manner the relationship expressing the numerical aperture of a test optic fiber can be expressed by:

$$NA = (F_1/F_2) \sin \tan^{-1}(\frac{1}{f_1})$$

Where:
NA = excitation numerical aperture
$f_1$ = f number of lens 13

From the foregoing both the spot size and the numerical aperture of the excitation light can be focused and continuously adjusted over a wide range of values. For example, for a spot size of 35.2μ meters, the excitation numerical aperture is adjustable from 0.11 to 0.62; for a spot size of 50.0μ meters, the numerical aperture ranges from 0.08 to 0.47; and for a spot size of 96.2μ meters, the numerical aperture is adjusted between 0.04 to 0.24. Naturally, different lens arrangements, light sources and test optic fibers would yield other adjustment ranges. Thus, practically any optical fiber can be matched to a source to assure that input equilibrium conditions are achieved over short lengths, a necessity for accurate measurement of optical attenuation, pulse dispersion (frequency response), and fiber numerical aperture for example.

While a single fixed focal length lens and a single zoom lens have been referred to in the foregoing discussion, the lens types can be varied including for example, a pair of zoom lenses or one different zoom lens can be used when the situation so demands. Likewise, more than three degrees of freedom can be employed at the micropositioner, for example, by allowing for angular as well as linear motion. Finally, the arrangement disclosed can be employed to illuminate other things besides optical fibers undergoing test and could find application wherever a variable spot size and a variable light ray solid angle are required.

Obviously, many modifications and variations of the present invention are possible in the light of the above teachings, and, it is therefore understood that within the scope of the disclosed inventive concept, the invention may be practiced otherwise than as specifically described.

What is claimed is:

1. Apparatus for providing a condition of equilibrium at the launching end of a selected optic fiber, said apparatus comprising:
   an apertured source of light;
   means for positioning said launching end of selected optic fiber so that a beam of light projected by said light source impinges upon said launching end;
   multiparameter adjustment means lying on the path of said projected light beam for enabling an operator to adjust the diameter and numerical aperture, over respective selected ranges, of a spot of light projected onto said launching end by said light beam; and
   means for enabling said operator to view said light spot as the diameter and numerical aperture of said light spot are adjusted by means of said multiparameter adjustment means, until the diameter of said light spot is equal to the diameter of the core of said optic fiber, and the numerical aperture of said light spot matches the numerical aperture of said optic fiber.

2. Apparatus for appying input excitation to the launching end of a first optic fiber, said apparatus comprising:
   a second optic fiber for transmitting light to a projecting end of said second optic fiber, and for projecting a beam of light from said projecting end, the relationship between the diameters of said first and second optic fibers being arbitrary;
   means for positioning said launching end of said first optic fiber so that a spot of light is projected upon said launching end of said first optic fiber by said light beam;
   means lying on the path of said projected light beam between said first and second optic fibers for collimating said light beam;
   adjustment means lying on the path of said projected light beam between said first and second optic fibers for enabling an operator to vary the diameter and numerical aperture of said light spot, over respective selected ranges, to establish a condition of equilibrium between the light transmitted through said second optic fiber to said projecting end, and the light which excites said first optic fiber through said launching end; and
   means for enabling an operator to view said light spot and said launching end of said first optic fiber as the diameter and numerical aperture of said light spot is varied by said adjustment means.

3. The apparatus of claim 2 wherein:
   said adjustment means comprises means for varying the diameter and numerical aperture of a spot of light provided by a second optic fiber having a core diameter which is different than the core diameter of the launching end of said first optic fiber.

4. The apparatus of claim 3 wherein said first optic fiber comprises a test sample of an optic fiber having parameters which are to be determined, and wherein:
   said positioning means comprises a micropositioning means connected to said optic fiber sample for enabling said optic fiber sample to be positioned with respect to at least three axes.

5. The apparatus of claim 3 wherein:
   said collimating means comprises a collimating lens of selected focal length for limiting the diameter of said projected light beam to a selected diameter.

6. The apparatus of claim 5 wherein:
   said projecting end of said second optic fiber is spaced at a distance from said collimating lens which is approximately equal to said selected focal length.

7. The apparatus of claim 3 wherein said adjustment means comprises:
   a zoom lens for selecting the numerical aperture of said light spot; and
   an adjustable f stop cooperating with said collimating lens to limit the diameter of said projected light beam to the core diameter of said first optic fiber.

8. The apparatus of claim 7 wherein said viewing means comprises:
   means interposed between said collimating lens and said zoom lens for splitting a portion of said projected light beam from the path of said light beam; and
   means for directing said light portion to the eye of said operator.

9. A method for enabling selected parameters of an optic fiber to be tested, said method comprising the steps of;
   selecting a short test length of said optic fiber;
   generating a light beam at a selected level of illumination;
   directing said light beam so that a spot of light of said light beam impinges upon the launching end of said test length of said optic fiber;

centering said light spot upon the center of said launching end;

selectively collimating said light beam to limit the diameter of said light spot to the core diameter of said test length;

passing said light beam through an adjustable zoom lens;

adjusting said zoom lens to match the numerical aperture of said light spot to the numerical aperture of said test length of said optic fiber; and viewing said light spot to obtain the information required to perform said collimating and zoom lengs adjustment steps.

10. A method of claim 9 wherein:

said light generating step comprises the step of projecting light out of a light source optic fiber having a diameter which is different from the diameter of said test length optic fiber.

* * * * *